United States Patent [19]
Bleek

[11] 3,981,153
[45] Sept. 21, 1976

[54] BODY PLATE SERVING TO SECURE DRAIN PIPES IN EMBANKMENTS

[76] Inventor: Walter Bleek, Am Juffernbach 12, 44 Munster-Handorf, Germany

[22] Filed: Jan. 17, 1975

[21] Appl. No.: 541,861

[30] Foreign Application Priority Data
Mar. 21, 1974  Germany............................ 2413526

[52] U.S. Cl.......................................... 61/16; 61/12
[51] Int. Cl.² ........................................... F16L 9/00
[58] Field of Search .............. 61/16, 17, 18, 12, 39, 61/35, 37, 63

[56] References Cited
UNITED STATES PATENTS

| | | | |
|---|---|---|---|
| 546,245 | 9/1895 | Parker ...................................... | 61/16 |
| 567,653 | 9/1896 | Parker ...................................... | 61/16 |
| 1,206,938 | 12/1916 | Stimmel et al.......................... | 61/16 |
| 1,270,046 | 6/1918 | Murray ............................ | 61/12 UX |
| 1,453,136 | 4/1923 | Hitchcock................................ | 61/16 |
| 2,636,352 | 4/1953 | Alger ........................................ | 61/16 |
| 2,958,200 | 11/1960 | Russell..................................... | 61/16 |

*Primary Examiner*—Dennis L. Taylor
*Attorney, Agent, or Firm*—Merchant, Gould, Smith, Edell, Welter & Schmidt

[57] ABSTRACT

A multiple component body plate serving to secure drain pipes in embankments is shown. A flat body plate is provided which serves as a support bearing and which has a generally rectangular cutout therein extending from one edge. A plurality of insert plates of different heights, one of which has a beveled opening for the drain pipe, are inserted and locked into the cutout between the parallel side edges thereof.

5 Claims, 2 Drawing Figures

BODY PLATE SERVING TO SECURE DRAIN PIPES IN EMBANKMENTS

BACKGROUND OF THE INVENTION

1. Field of the Invention:

The invention relates to a multiple component body plate serving to secure drain pipes in embankments, and surrounding the drain pipe, wherein the insert plate that accepts the pipe is insertable, in locking fashion, into a structural component that serves as a support bearing.

2. Description of the Prior Art:

When introducing drain pipes into open trenches and from there into embankments for these trenches, it is necessary to secure the drain pipe against the flow of water within the trench. Up until the present time, this has been done by walling in the drain such that a certain area around the drain pipe is provided with a mortared layer of stone that rests on an associated base. This work is time consuming and particularly difficult since transport of the heavy materials to the site must be done over roadless areas of countryside which frequently are scarcely capable of bearing the vehicle load because of works previously carried out.

Already proposed in U.S. Pat. No. 2,958,200 is an advantageous, metallically structured component that serves for anchoring the drain pipe in trenches. In the case of this component, fastening of the drain pipe into the plate-shaped member is accomplished through a relatively stiff and fixed box-type coupling joint so that variations in height of the outlet opening of the pipe relative to the plate-shaped member, within the angle of inclination of the pipe and relative to the diameter of the pipe, are not possible, it being, rather, necessary to have ready a number of different plate-shaped members for adaptation to whatever conditions might exist. This makes positioning and the rapid and problem-free use of it on the job site difficult.

Already known from East German Patent No. 48,362 is a dam sluiceway serving, advantageously, for holding back water and for dam control in inland watering systems, and which consists of a multiple section body plate wherein the insert plate accepting the pipe is insertable, locking fashion, into a structural component serving as a support bearing. The actual insert plate, here, is constructed relatively large and features the opening for the pipe that is to be inserted in its lower one-third portion. Here also, variations relative to the height and lateral position of the pipe are not possible.

SUMMARY OF THE INVENTION

As compared to the known arrangements, the task set forth for this invention is to provide a prefabricated arrangement for securing drain pipes in embankments that permit compensating for deviations in the predetermined height and lateral positions and which are, additionally, intended to be adaptable, in the simplest manner, to the different diameter pipes.

This basic goal for the invention is achieved by the fact that, within the body plate that serves as a support bearing, there is provided a cutout having lateral edges that run parallel to each other, into which can be inserted insert plates of different heights, one of which displays an opening that surrounds the pipe.

The insert plates are preferably locked in place from the back side of the body plate so that later loosening of this insert plate is no longer possible after the body plate has been set in the embankment, for example by intruders.

The circumferential edge of the opening in the insert plate that surrounds the pipe is preferably constructed to be beveled so that any desired angle of inclination of the pipe that is to be fitted can be controlled.

In order to obtain additional anchoring of the body plate, an anchor plate is provided that is joined to the body plate through means of a flexible coupling and which takes up any strain normal to the plane of the body plate and (also) takes care of providing sufficient securing of the body plate inside the ground.

Secure placement of the body plate is reinforced in that the body plate is provided with projecting flanges that are essentially at a right angle to the flat plane.

Although the actual body plate can consist of any formable materials used in construction work, for example concrete or the like, it is important that the body plate consist of a synthetic material, and preferably of a fiber-glass reinforced synthetic material, which combines high resistance with a relatively light weight, so that transport to the installation site, even in the case of bad countryside conditions, is easily possible.

BRIEF DESCRIPTION OF THE DRAWINGS

An example of embodiment for the invention will be explained, in conjunction with the drawing, in that which follows. The drawing shows in FIG. 1 a perspective representation of the body plate installation; and in FIG. 2 the individual structural parts of the actual body plate in an exploded view.

DESCRIPTION OF THE PREFERRED EMBODIMENT

Figure 1:
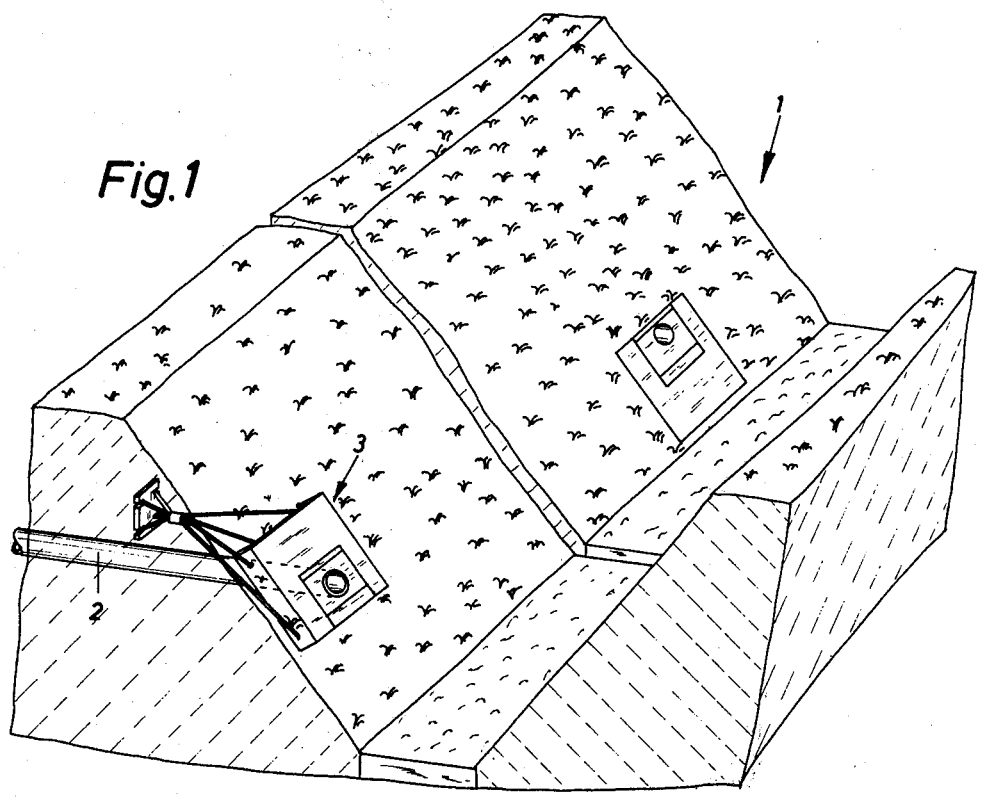

In FIG. 1, the trench for guiding the water is designated by 1, in which there discharges a drainage pipe 2, for example. The point of discharge of pipe 2 into trench 1 is insured by a cover 3, such that further projection of the pipe opening into the trench is no longer possible.

The actual cover consists of a body plate 4 displaying a cutout 5 whose edges are slotted, as can be clearly recognized in the drawing. Body plate 4, at right angles to the flat plane, displays rearwardly projecting flanges 6 and 7 which press into the ground.

Figure 2:
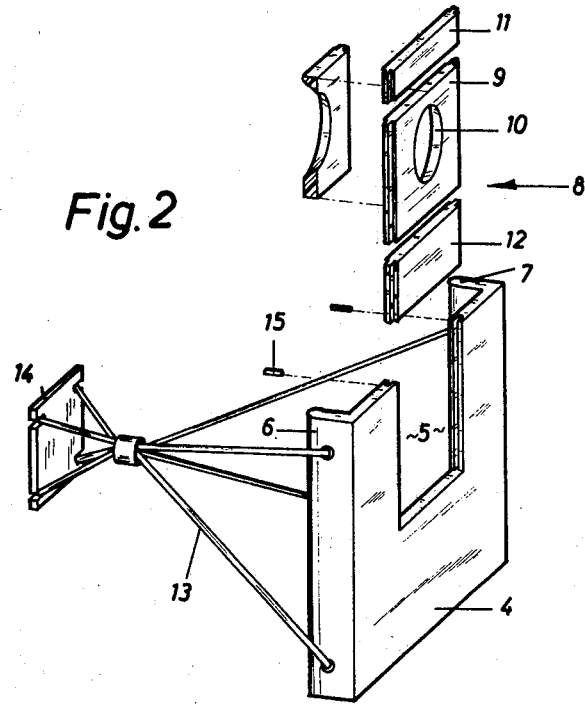

Insertable into cutout 5 are insert plates 8, where, in the case of the example of embodiment shown, there are three such insert plates shown. Insert plate 9 also displays an opening 10 for accepting pipe 2, insert plate 11 displays, relative to the height of insert plate 9, an essentially lesser height, while insert plate 12 has a height lying between the height of insert plate 9 and the height of insert plate 11. By means of a different insertion of these insert plates it is possible to adapt to the height of the drain pipes without difficulty. As is indicated in FIG. 2, insert plates 9 having different size openings 10 can be provided, whereby it is possible to adapt these openings to standard size pipes 2.

Flexible connection means attach to flanges 6 and 7 of body plate 4 which, at their ends facing body plate 4, support an anchor plate 14 which serves for additional anchoring of body plate 4 in the ground. Here it is also, self-understood, possible that flanges 6 and 7 display an additional bend or other anchoring means that further reinforce holding the flanges in the ground.

As the representation in FIG. 1 shows, it is possible to set the body plate in with the open side of cutout 5 directed differently in the trench wall whereby, in conjunction with the different height insert plates 9, 11 and 12, further fitting of the pipe to the individual locations is possible.

Insert plates 9, 11 and 12 display, on their outside edges, projections that cooperate slot-wise and flexibly with the slots in the edges of cutout 5 such that there is guaranteed an already sufficient position-anchoring of the insert plate in the cutout. Additionally, the insert plates are locked by locking means 15, for example small bolts or the like, extending out from the back side of body plate 4 such that loosening of these insert plates by intruders after installation of the body plate is no longer possible.

What is claimed is:

1. Multiple component apparatus for securing drain pipes in embankments comprising a body plate member (4) having opposite end edges and opposite side edges, and having a generally rectangular cutout (5) of predetermined depth therein opening from one edge thereof, means for holding said body plate member in position on the embankment with said cutout surrounding the drain pipe, insert plate means having an opening (10) to accept the drain pipe and being insertable, in locking fashion, in said cutout of said body plate member, said cutout having lateral edges that run parallel to each other and into which is inserted said insert plate means, said insert plate means comprising a plurality of generally rectangular insert plates (9, 11, 12) one of which displays said opening (10), said insert plates being of different heights, the combined heights of which equal said predetermined depth of said cutout such that compensation for deviations in the predetermined height of the drain pipe in the embankment is permitted.

2. Apparatus in accordance with claim 1 wherein means are provided to lock (at 15) the insert plates (9, 11, 12) in place from the back side of body plate member (4).

3. Apparatus in accordance with claim 1 wherein the circumferential edges of opening (10) are beveled.

4. Apparatus in accordance with claim 1 wherein an anchor plate (14) is attached to the body plate through a flexible connecting means (13).

5. Apparatus in accordance with claim 1 wherein body plate member (4) is flat and is provided with rearwardly extending flanges (6,7), each projecting at essentially a right angle to the plane thereof from the opposite sides thereof.

* * * * *